US011760539B2

(12) United States Patent
Angeloni et al.

(10) Patent No.: US 11,760,539 B2
(45) Date of Patent: Sep. 19, 2023

(54) RECLOSABLE MULTI-ARTICLE CONFECTIONARY PRODUCT PACKAGING AND METHODS WITH MULTI-LAYER GRAPHIC BRANDING

(71) Applicant: WM. WRIGLEY JR. COMPANY, Chicago, IL (US)

(72) Inventors: Paul J. Angeloni, Chicago, IL (US); Christopher H. Cunningham, Grays Lake, IL (US); Allen S. Aldridge, Addison, IL (US); Peter Muller, Chicago, IL (US); William Tham, Palatine, IL (US); David Jaggi, Oak Park, IL (US); Ross Bartels, Chicago, IL (US); Joseph F. Vrana, Schaumburg, IL (US); Leonard Matulewicz, Oswego, IL (US); Justin Hollyn-Taub, Chicago, IL (US); Erika Wetzel, Chicago, IL (US)

(73) Assignee: WM. WRIGLEY JR. COMPANY, Chicago, IL (US)

(*) Notice: Subject to any disclaimer, the term of this patent is extended or adjusted under 35 U.S.C. 154(b) by 745 days.

(21) Appl. No.: 15/069,290

(22) Filed: Mar. 14, 2016

(65) Prior Publication Data
US 2017/0259958 A1  Sep. 14, 2017

(51) Int. Cl.
*B65D 25/20* (2006.01)
*B65D 77/00* (2006.01)
(Continued)

(52) U.S. Cl.
CPC ............. *B65D 25/205* (2013.01); *A23G 4/00* (2013.01); *B65B 5/06* (2013.01); *B65B 5/061* (2013.01);
(Continued)

(58) Field of Classification Search
CPC .... B65D 25/205; B65D 81/266; B65D 25/54; B65D 43/16; B65D 51/248; B65D 65/02;
(Continued)

(56) References Cited

U.S. PATENT DOCUMENTS 2,380,367 A * 7/1945 Ranney ................ B65D 75/38
206/449
5,885,630 A * 3/1999 Zurawski ............. B65D 81/266
426/118
(Continued)

FOREIGN PATENT DOCUMENTS

EP         1864916 A1    6/2009
WO    2007/070781 A2    6/2007
(Continued)

OTHER PUBLICATIONS

Perimeter Brand Packaging, [on line] Oct. 4, 2013, retrieved Jun. 7, 2018. Retrieved from the Internet: URL:<https://web.archive.org/web/20131004072902/http://perimeterbp.com/qtip-purse-pack>.*
(Continued)

*Primary Examiner* — Viren A Thakur
*Assistant Examiner* — Chaim A Smith

(57) ABSTRACT

A reclosable hard shell transparent container for a confectionary product includes an inner graphic branding element extending interior to the receptacle, an outer graphic branding element extending exterior to the receptacle, and overwrap layer that collectively provide visually superimposed branding graphics to provide visually distinct packages utilizing the same container. The inner graphic layer facilitates a subassembly of the confectionary products for ease of loading the confectionary product in the container.

16 Claims, 6 Drawing Sheets

(51) Int. Cl.

| | |
|---|---|
| *B65D 81/24* | (2006.01) |
| *B65D 77/02* | (2006.01) |
| *B65B 5/06* | (2006.01) |
| *B65D 25/36* | (2006.01) |
| *A23G 4/00* | (2006.01) |
| *B65D 25/54* | (2006.01) |
| *B65D 43/16* | (2006.01) |
| *B65D 51/24* | (2006.01) |
| *B65D 65/02* | (2006.01) |
| *B65B 25/00* | (2006.01) |
| *B65B 61/20* | (2006.01) |
| *B65D 85/60* | (2006.01) |

(52) U.S. Cl.
CPC ............. *B65D 25/36* (2013.01); *B65D 25/54* (2013.01); *B65D 43/16* (2013.01); *B65D 51/248* (2013.01); *B65D 65/02* (2013.01); *B65D 77/003* (2013.01); *B65D 77/02* (2013.01); *B65D 81/24* (2013.01); *B65B 25/005* (2013.01); *B65B 61/20* (2013.01); *B65D 85/60* (2013.01); *B65D 2203/00* (2013.01); *B65D 2203/02* (2013.01)

(58) Field of Classification Search
CPC ...... B65D 77/02; B65D 77/003; B65D 81/24; B65D 85/60; B65D 2203/00; B65D 2203/02; B65B 5/06; B65B 25/005; B65B 61/20; A23G 4/00
USPC ....... 206/800, 770, 776, 778, 775, 836, 837; 426/5
See application file for complete search history.

(56) References Cited

U.S. PATENT DOCUMENTS

| | | | | |
|---|---|---|---|---|
| 6,644,488 | B1* | 11/2003 | Coleman | B65D 21/0204 |
| | | | | 206/800 |
| 2002/0063079 | A1* | 5/2002 | Loth | B65D 25/107 |
| | | | | 206/526 |
| 2005/0089605 | A1 | 4/2005 | Siethoff et al. | |
| 2005/0255197 | A1* | 11/2005 | Aldridge | B65D 5/48044 |
| | | | | 426/108 |
| 2010/0025416 | A1 | 2/2010 | Sawin | |
| 2011/0233106 | A1 | 9/2011 | Fluegel et al. | |
| 2013/0284621 | A1 | 10/2013 | Dincer et al. | |
| 2015/0014404 | A1 | 1/2015 | Iwata et al. | |

FOREIGN PATENT DOCUMENTS

| | | |
|---|---|---|
| WO | 2008116177 A1 | 9/2008 |
| WO | 2010060120 A2 | 5/2010 |
| WO | 2015024631 A1 | 2/2015 |

OTHER PUBLICATIONS

4sgm, [on line] no date given, retrieved from the Internet: URL<http://www.4sgm.com/is-bin/intershop.static/WFS/4sgm-Storefront-Site/-/en_US/images/product_new/M/59514_M.jpg>.*
Perimeter Brand Packaging, [on line] Oct. 4, 2013, retrieved Jun. 7, 2018. Retrieved from the Internet: URL:https://web.archive.org/web/20131004072918/http://perimeterbp.com:80/travelpack.*
Perimeter Brand Packaging, [on line] Oct. 4, 2013, retrieved Jun. 7, 2018. Retrieved from the Internet: URL:https://web.archive.org/web/20131004072923/http://perimeterbp.com:80/travelpackxl.*

* cited by examiner

RECLOSABLE MULTI-ARTICLE CONFECTIONARY PRODUCT PACKAGING AND METHODS WITH MULTI-LAYER GRAPHIC BRANDING

BACKGROUND OF THE INVENTION

The field of the invention relates generally to product packaging and methods of packaging products, and more specifically to reclosable, multi-article hard shell packages and methods for packaging and dispensing an edible confectionery product such as chewing gum sticks.

Packaging for confectionery products such as chewing gum, candy, or mints tends to be highly customized. Such packaging may include a container formed in a variety of sizes, shapes, colors, and designs such that particular types and flavors of confectionary products are readily distinguished with distinct packaging for the benefit of the consumers in locating their confections of choice at a point of sale. Customization of the packaging for branding purposes, however, tends to be tedious and costly to confectionary product manufacturers. Especially for large scale manufactures of confectionary products, managing a large inventory of different packages can present substantial cost and consume substantial resources to packaging operations in mass production processes.

Conventional packaging of confectionary products such as chewing gum also tend to be designed principally for the point of sale rather than for later use of the package by the consumer. Confectionary product packages tend to be relatively small in comparison to other packages of multi-article edible food products, and also tend to be handled and carried on a more frequent basis than packages of other types of products. This presents a number of challenges from the manufacturer side as well as the consumer side that have yet to completely addressed in the marketplace. Improvements are desired.

BRIEF DESCRIPTION OF THE INVENTION

In one aspect, a package for a confectionary product includes a hard shell container that is at least partly transparent, wherein the container includes a base portion defining a first receptacle and a reclosable lid portion defining a second receptacle. A confectionary product resides partly in the first receptacle and partly in the second receptacle, and an inner graphic branding layer is extended inside at least one of the first receptacle and the second receptacle. The inner graphic branding layer is visible from an exterior of the container through the at least partly transparent container.

In another aspect, a package for a confectionary product includes a transparent hard shell container including a base portion defining a first receptacle and a permanently attached reclosable lid portion defining a second receptacle. The lid portion is selectively positionable relative to the base portion between an opened position and a closed position, and the first and second receptacles are differently proportioned but collectively dimensioned to receive and enclose multiple articles of a confectionary product when the lid portion is in the closed position. An inner graphic branding element layer extends inside the first receptacle and is visible from an exterior of the base portion through the transparent hard shell container. The inner graphic branding element holds a portion of the multiple articles of the confectionary product in a predetermined orientation, and an outer graphic branding element layer extends on the exterior surface of the transparent hard shell container and is visually superimposed over the inner graphic branding element layer.

In another aspect, a method of packaging a confectionary product in a hard shell container that is at least partly transparent is disclosed. The hard shell container includes a base portion defining a receptacle and a reclosable lid portion. The method includes providing an inner graphic branding element layer inside the receptacle such that it is visible through the at least partly transparent hard shell container from an exterior of the base portion and providing an outer graphic branding element layer extending on an exterior surface of the hard shell container such that the outer graphic branding element layer is visually superimposed on the inner graphic branding element layer.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
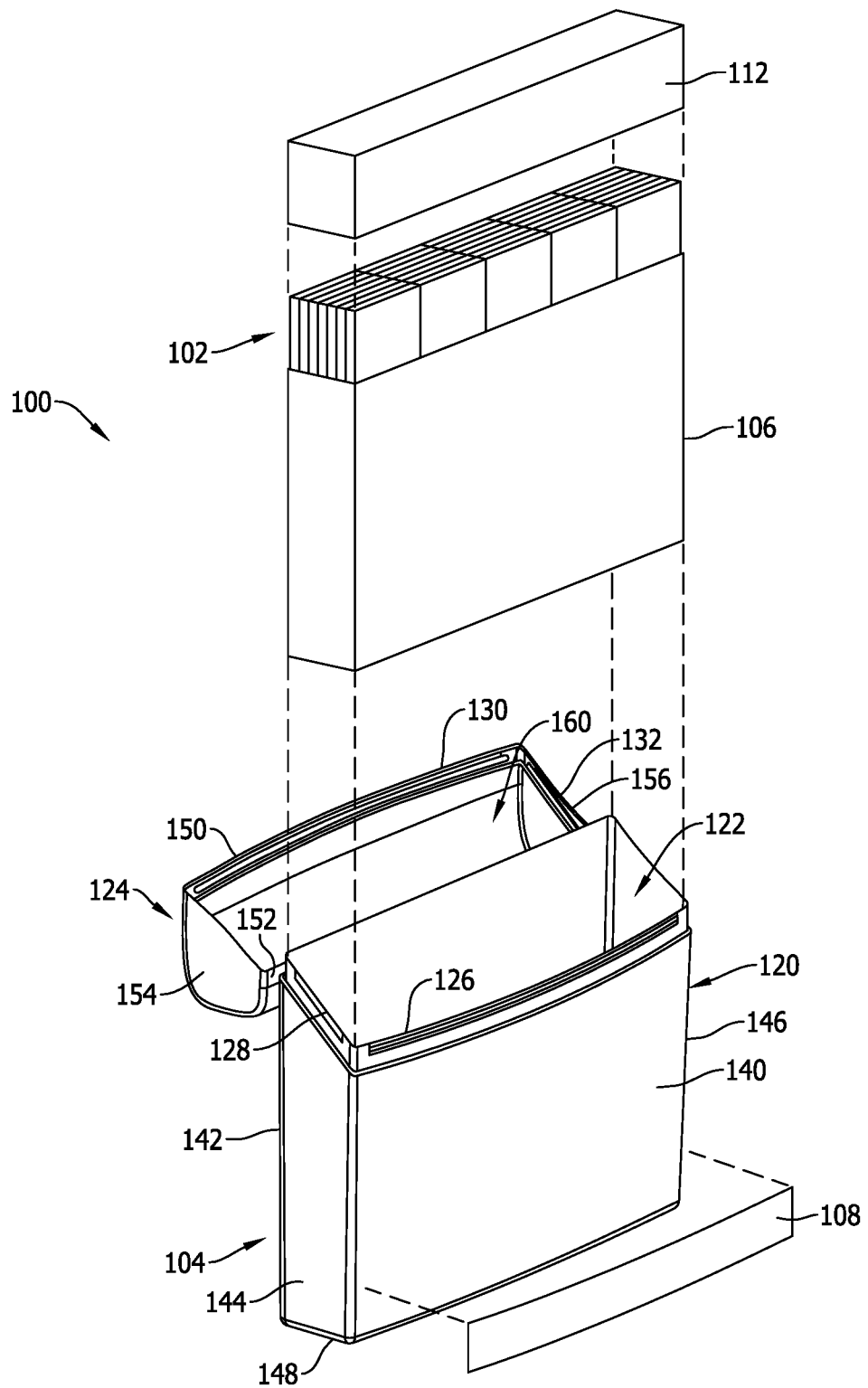
FIG. 1 is a partial exploded view of a confectionary product package according to an exemplary embodiment of the present invention.

In order to understand the invention to its fullest extent, some discussion of the state of the art is presented below in which certain problems and disadvantages are discussed, followed by a discussion of exemplary embodiments of the invention that overcome the problems and disadvantages in the art. Method aspects will be in part apparent and in part explicitly discussed in the following description.

A great variety of packaging is known that tends to be rather customized to present a particular type or flavor of confectionary product at a point of sale with a distinctive appearance. Paper board and foil-based packages have been conventionally provided in different sizes and shapes, and in different colors with stylized branding and logos that are unique to each type of product in the package. Hard shell plastic containers are sometimes utilized with certain types of confectionary products, and such containers may be designed with integrally formed and molded branding features including but not limited to unique shapes, colors, and surface artwork including stylized logos and design elements. While traditional branding of such packaging can be effective for product manufacturers and consumers alike, maintaining adequate inventories of customized packaging elements across a full line of different confectionary products tends to be tedious and expensive as conventionally implemented.

In use, packaged confectionary products such as chewing gum sticks are typically consumed over a period of time after the package is initially opened. The confectionary products in the package may be removed in small amounts, or even one at a time, for consumption while the rest are saved for later. If the consumer does not open a conventional paper-based or foil-based package carefully, however, it can rather quickly become practically useless to retain the packaged chewing gum sticks thereafter. Hard shell containers may avoid this problem, but conventional hard shell containers present access problems for dispensing larger items such as chewing gum sticks. Smaller candy and mint articles may also be more densely packed in a hard shell container than the larger chewing gum sticks, with higher density packaging offsetting the higher cost of hard shell containers. Hard shell containers therefore accordingly tend to be adopted only for relatively smaller confectionary product items such as candy and mints.

Unlike packages for other types of edible food products, packages for confectionary products may be small enough to be conveniently carried in a pocket of a person's clothing, carried in a purse, brief case or travel bag, or carried in a storage compartment of a vehicle so that the confectionary product is easily transported by the consumer and available wherever, as well as whenever, a consumer desires.

When carried by a consumer in such a manner, however, confectionary product packages are typically placed in contact with other items that are loosely packed, jostled, and subjected to a variety of impact forces and compressive loads. As a result, conventional confectionary product packages may be exposed to a good deal of wear and tear that relatively quickly compromises the package appearance and function. In the case of chewing gum sticks, once a piece of chewing gum has been removed from a paper-based or foil-based package the package becomes effectively collapsible and vulnerable to scratching, marring and tearing quite easily. The package can quickly become nearly unrecognizable in some instances and any branding provided in the packaging may become ineffective.

For some consumers, wear and tear of the package can negatively affect use and enjoyment of the confectionary products as the worn package may impart a perceived undesirability of the confectionary products within. Specifically, a well-worn package tends to look older than a new one, and a worn package can create an impression for the consumer that the confectionary product is not fresh and accordingly is undesirable. Improvements in confectionary product packages are accordingly desired.

As explained in detail below, a package for confectionary products such as chewing gum sticks is proposed including a durable hard shell container that is at least partly transparent, in combination with a multi-layered graphic application that facilitates packaging processes, provides for distinctly different visual appearance of packages at relatively low cost, and better withstands wear and tear after purchase. While described in the exemplary context of packaging of chewing gum sticks, it is appreciated that the concepts disclosed may apply to other confectionary products, other edible food items, and even non-edible products as desired.

Figure 2:
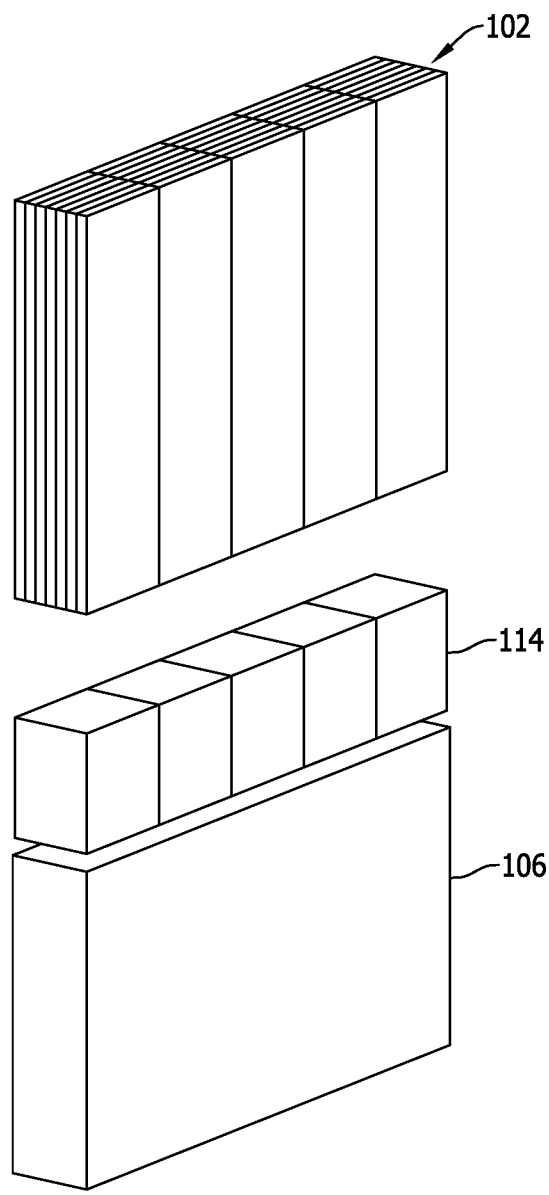
FIG. 2 is a partial exploded view of a portion of the confectionary product package shown in FIG. 1.
Figure 4:
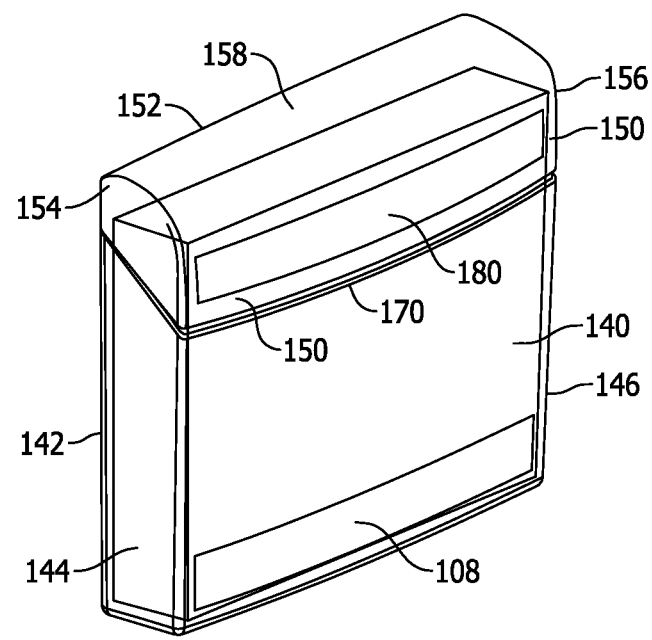
FIG. 4 is a perspective view of the exemplary confectionary product package shown in FIG. 1 for a point of purchase display.

Turning now to the Figures, and as seen in FIG. 1, a package 100 for confectionary products such as chewing gum sticks 102 is disclosed including a durable hard shell container 104 that is at least partly transparent, in combination with a multi-layered graphic application including an inner graphic branding layer 106, an outer graphic branding layer 108, and an overwrap graphic branding layer 110 (FIG. 4). As also shown in FIG. 1, a freshness seal element 112 may also be provided in combination with the inner graphic branding layer 106 for a point of sale purchase. An organization element 114 as shown in FIG. 2 is also provided that is internal to the inner graphic branding layer 106 to facilitate packaging process of the chewing gum sticks 102, which are in contemplated embodiments wrapped in foil according to known techniques in the art separately and apart from the packaging described herein.

In contemplated embodiments, the container 104 may be a hard shell, reclosable container fabricated from a durable plastic material such as polypropylene according to known molding techniques. The container 104 is formed free of manufacturing artifacts such as injector pin marks, witness lines, etc. to provide a clean container design without blemish that could detract from the graphic branding element layers 106, 108, 110 later described. The container 104 may be integrally formed with a flat bottomed base portion 120 defining a receptacle 122 dimensioned to receive a number of articles of confectionary products therein such as the foil wrapped chewing gum sticks 102, and a reclosable lid portion 124 coupled to the base portion 120 and selectively positionable relative to the base portion 120 between an opened position (FIGS. 1, 5 and 6) and a closed position (FIGS. 3, 4, 7 and 9) without detaching from the base portion 120. In the opened position of the lid portion 124, access to the receptacle 122 and all of the chewing gum sticks 102 packed therein is provided, whereas in the closed position the lid portion 124 covers the receptacle 122 and seals the receptacle and chewing gum sticks 102 remaining therein. In another embodiment, the lid portion 124 could be separately formed and detachable from the base portion 120 if desired.

As best shown in FIG. 1, the base portion 120 and lid portion 124 are provided with complementary sealing elements 126, 128 and 130, 132 respectively in the form of projections and recesses that collectively provide an interlocking sealing arrangement producing tactile and audible feedback when fully closed. A snap-fit engagement is designed to produce an audible click sound when the lid portion 124 is completely closed and engaged with the base portion 120. By virtue of the tactile and audible feedback provided on the snap/seal feature the consumer may intuitively know that the lid portion 124 is completely closed and sealed, as well as to communicate a sense of security and freshness when the lid portion 124 is opened and closed. Once closed, the lid portion 124 is latched to the base portion 120 and remains closed until again opened by a consumer.

The base portion 120 in the example shown is formed with multiple walls defining interior and exterior faces or surfaces such as a front wall 140, a rear wall 142 opposing the front wall 140, opposing lateral side walls 144, 146 interconnecting the front and rear walls 140 and 142, and a flat bottom wall 148. The receptacle 122 is formed interior to the walls 140, 142, 144, 146, 148 and is open-ended opposite the bottom wall 148. In contemplated embodiments, all of the walls 140, 142, 144, 146, 148 of the base portion 120 are transparent or fabricated from a see through material. It is appreciated, however, that in alternative embodiments, less than all of the walls 140, 142, 144, 146, 148 may be transparent, and is possible for one or more of the walls to be only partly transparent for at least some of the benefits of the claimed invention to be realized. The bottom wall 148 of the base portion 120 includes a flat support surface allowing the container 104 to stand upright when desired. The front and rear walls 140, 142 are formed with convex curvature providing an elegant and distinctive shape that is not possible using conventional paperboard or foil packaging.

Figure 6:
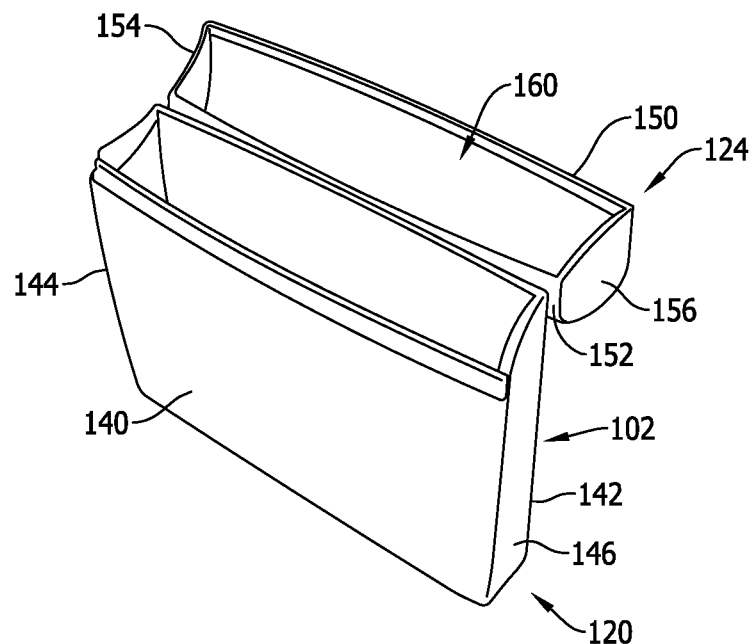
FIG. 6 is a front perspective view of the container shown in FIGS. 1-5 with the lid in the opened position.

In the example shown, the reclosable lid portion 124 is permanently attached to the base portion 120 as shown in FIG. 6 via an elongated and integrally formed living hinge such that the lid portion 124 may be folded opened or closed about the hinge while the lid portion 124 and the base portion 120 remain attached to one another. The lid portion 124 may include corresponding walls to the base portion 120 of the container 104. That is, the lid portion 124 may be formed with multiple walls defining interior and exterior faces or surfaces such as a front wall 150, a rear wall 152 opposing the front wall 150, opposing lateral side walls 154, 156 interconnecting the front and rear walls 150 and 152, and a top wall 158. The walls 150, 152, 154, 156, 158 define an interior and open-ended receptacle or cavity 160 therebetween.

Figure 5:
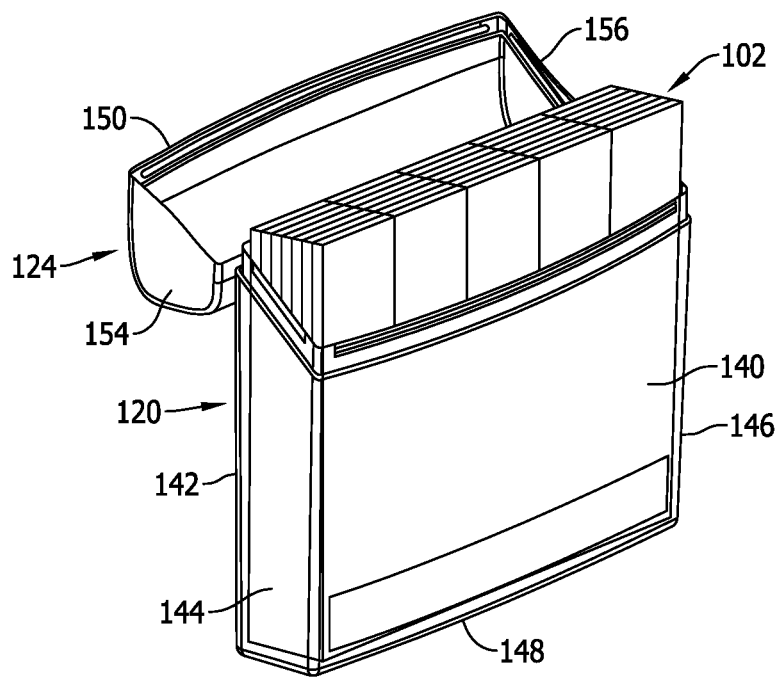
FIG. 5 is a front perspective view of the package shown in FIG. 4 in an opened condition for consumption of the confectionary product by a consumer.

In combination, the receptacle 160 of the lid portion 124 and the receptacle 122 of the base portion 120 enclose the chewing gum sticks 102 when the lid portion 124 is closed. In the example shown, the receptacle 160 in the lid portion 124 is much smaller than the receptacle 122 in the base portion 120. As such, the receptacle 122 in the base portion 120 receives a much large proportion of the chewing gum sticks 102 than the receptacle 160 of the lid portion 124 when the lid portion 124 is closed. As best shown in FIG. 5, the chewing gum sticks 102 are oriented vertically in the container 104 and upper ends of the chewing gum sticks 102 protrude from the receptacle 122 when the lid portion 124 is opened such that the chewing gum sticks 102 may be easily accessed for withdrawal from the container 104 by a consumer when the lid portion 124 is opened.

Figure 7:
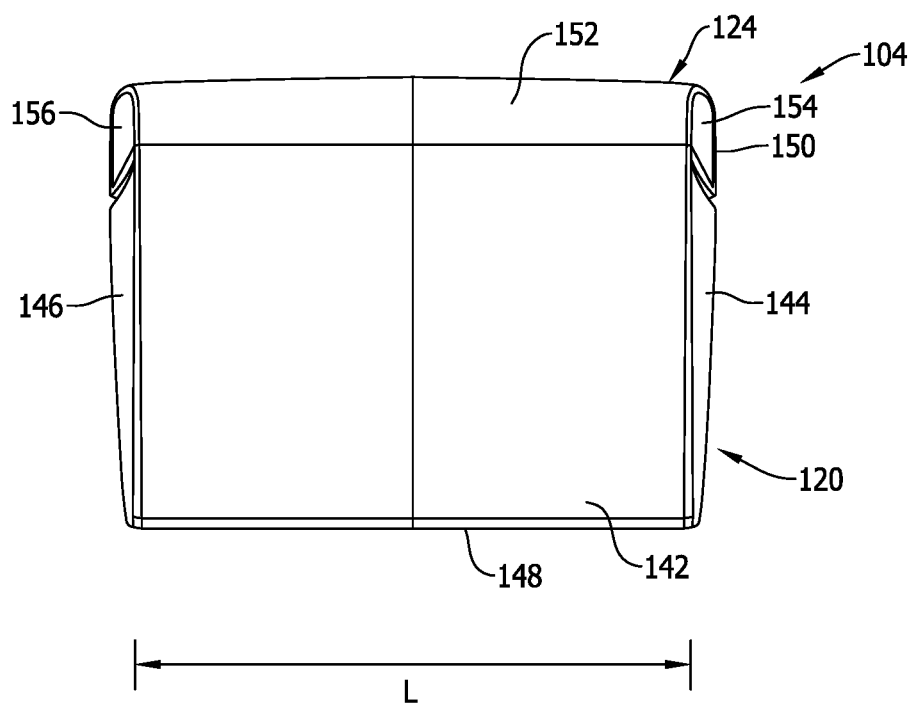
FIG. 7 is a rear elevational view of the container shown in FIG. 6.
Figure 9:
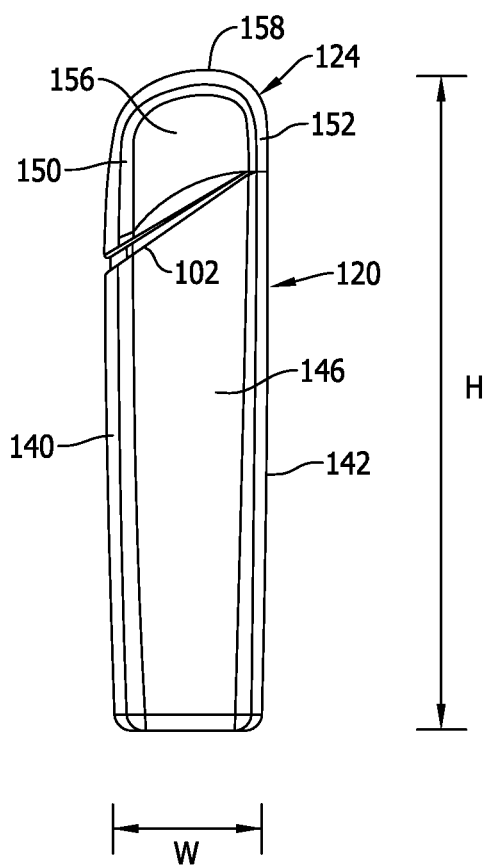
FIG. 9 is a side elevational view of the container shown in FIG. 6.

As also shown in FIG. 6, the side walls 144, 146 of the base portion 120, as well as the side walls 154, 156 of the lid portion 124 are sloped and tapered such that the back side of the receptacle 122 is deeper than the front side of the receptacle 122. As seen in FIGS. 7 and 9, the front side of the lid portion 124 extends farther down on the front wall 150 than on the rear wall along the height dimension H (FIG. 7). The height dimension H is seen to be greater than the width dimension W of the package as shown in FIG. 9. The package 100 accordingly has relatively large length L and height H but a relatively small width W. Other relative dimensional proportions are possible in other embodiments as desired.

The receptacles 122 and 160 in the container base portion 120 and the lid portion 124 are differently shaped as well in the illustrated example. While the receptacle 122 in the base portion 120 is flat on the bottom, the receptacle 160 is curved on the top. The asymmetry of the base portion 120 and the lid portion 124 also contributes to ease of access of the chewing gum sticks 102 when the lid portion 124 is opened and also facilitates clearance of the chewing gum sticks 102 as the lid portion 124 is closed. The shape and relative proportions of the receptacles 122 and 160 in the base portion 120 and the lid portion 124 are exemplary only, and may vary in different embodiments.

Like the base portion 120, all of the walls 150, 152, 154, 156, 158 of the lid portion 124 may be transparent or fabricated from a see through material. It is appreciated, however, that in alternative embodiments, less than all of the walls 150, 152, 154, 156, 158 may be transparent, and is possible for one of the walls to be only partly transparent for at least some of the benefits of the claimed invention to be realized. In some embodiments, the base portion 120 and the lid portion 124 may be tinted, but still transparent or see through to facilitate the branding effects described below with still more variation of appearance of the package.

By virtue of the curved shape of the walls 142, 152 of the respective base portion 120 and the lid portion 124, the hinge connecting the base portion 120 and the lid portion 124 extends between curved surfaces. As such, once the lid portion 124 is opened it remains open until again closed by the consumer. Unlike conventional containers including integrally formed hinges, the shape of the lid portion 124 and the base portion 120 at the location of the hinge resists a tendency of the lid portion 124 to naturally return to the closed position once it has been fully opened. Full access to the chewing gum sticks 102 is accordingly provided for as long the consumer wishes.

Figure 8:
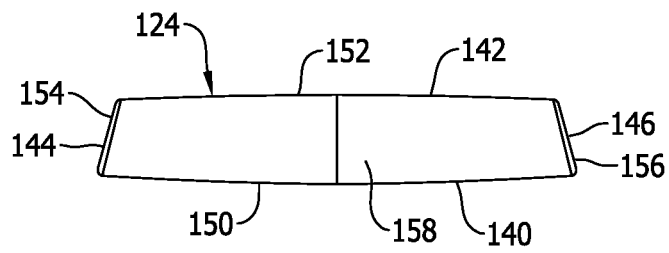
FIG. 8 is a top view of the container shown in FIG. 6.

An opening groove 170 (FIGS. 3 and 4) is located on the exterior of the front wall 140 of the container 104 as a visual cue for opening of the lid portion 124. The groove 170 further facilitates a natural interaction point for opening the lid portion 124 with the consumer's thumb and/or index finger. As shown in FIGS. 7 and 8, the side walls 144, 146 of the base portion 120 and the side walls 154, 156 are each flared and oppositely sloped toward the rear wall 142 such that the front wall 140, 150 of each of the base portion 120 and the lid portion 124 are longer in the length dimension L (FIG. 7) than the corresponding rear walls 142, 152. The sides of the container 104 accordingly have a wing-like shape that is easily grasped with one's fingers. Curved indents are also provided in the lid portion 124 as primary interaction points for opening the container 104. The curved front surface of the container base portion 120 further assists in opening of the lid portion 124 when depressed. The concave curvature of the side walls 144, 146 conforms to the human hand for optimal ergonomic interaction.

Material savings are also realized by the flared side walls relative to more conventional box-like containers 104 having opposing sides of equal length L. The curved walls of the lid portion 124 and the base portion 120 in the example shown are more ergonomic than conventional containers and are accordingly easier to grasp and use for dispensing of the chewing gum sticks 102. In particular, the lid portion 124 in FIG. 9 is shown to have a complex curvature that facilitates a gripping of the lid portion 124 at the side walls thereof to easily open and close the lid portion 124.

The multi-layered graphic branding application will now be explained that in combination with the transparent portions of the container 104 provides further cost savings while facilitating very different and distinct branding capability to the package 100.

In contemplated embodiment, the foil used to wrap the chewing gum sticks 102 may itself include branding graphics and convey a sense of freshness to the consumer. The branding may be enhanced significantly with the other branding element layers 106, 108 and 110 that are each separately provided and applied to the container 104 to complete the package 100.

As shown in FIGS. 1-5, the first or inner graphic bonding layer 106 of the multi-layered graphic branding application is extended inside the receptacle 122 defined by the container base portion 120. Specifically, the inner layer 106 extends along and against each of the interior surfaces of the receptacle 122. Because the base portion is transparent, the inner layer is visible from the exterior through the exterior surfaces of the container 104. The multi-layered graphic branding application also includes the second or outer layer 108 extending on an exterior surface of the container base portion 120, and the third overwrap layer 110 extending over the base portion 120 and the lid portion 124 of the container 104 and also overlying the second layer 108 and the first layer 106 when the package 100 is completed.

Each of the first and second layers 106, 108 and the overwrap layer 110 may include portions thereof having distinct colors, text and/or graphical indicia that collectively provide packages of distinctly different appearance on the various faces of the container as explained below. The first layer 106 is visible through the transparent surface(s) of the container 104, the second layer 108 is visible on the exterior surface of the container and is effectively visually superimposed on the first layer 106, and the third layer 110 is superimposed over the first and second layers 106 and 108 to collectively create a desired visual impression.

By using a common transparent container 104 and different inner, outer and overwrap layers 106, 108 and 110 various different branding schemes may be implemented with the first and second layers 106 and 108 and the overwrap layer 110 to differentiate different type of confectionary products, or different flavors of the same type of confectionary product such as chewing gum sticks 102. The inner, outer and overwrap layers 106, 108 and 110 may be configured differently with, for example, printing processes or other known techniques to provide desired graphics at relatively low cost that may be employed with the common transparent container 104. Substantial cost savings may be realized via the common transparent container 104 relative to more conventional packaging including customized containers with integrated branding features such as container colors and integrally formed indicia and artwork.

In contemplated examples, the inner graphic branded layer 106 may be provided with a color or pattern that relates to the branding strategy or theme of the confectionary product 102. The color or pattern of the inner layer 106 is visible through the transparent container 104, such that the container 104 may easily assume a practically unlimited number of colors or patterns in appearance via the inner layer 106 provided on the interior of the container 104 in the receptacle 122. For example, if the inner layer 106 is colored green the transparent container 104 visually appears to be green and if the inner layer 106 is colored blue the container 104 visually appears to be blue. As another example, if the inner layer 106 includes a spearmint leave picture or pattern, the container visually appears to have spearmint leaves and a flavor cue is provided when the package includes spearmint flavored chewing gum sticks 102. Any color or arrangement of colors, artwork, picture or patterns may be adopted to provide a practically unlimited number of different appearances of the container 104 on its various surfaces by virtue of the inner layer 106 to promote any desired branding of the confectionary product therein. Text, symbols, or indicia may also be provided on the inner layer 106 as desired for branding purposes if desired.

Beneficially, the inner layer 106 extending inside the receptacle 122 of the container base portion 120 is protected by the transparent container 104 and is accordingly wear resistant from the exterior of the container 104. The package 100 may accordingly retain a fresh and attractive appearance over an extended period of time.

In contemplated embodiments, and as also shown in the example shown in FIGS. 1-5, the first or inner layer 106 may be fabricated from paper board or another suitable material that is wrapped or folded around the bottom and side edges of a number of the confectionary products such as foil wrapped chewing gum sticks 102. The inner layer 106 may accordingly hold the confectionary products 102 together in a predetermined arrangement before being inserted into the hard shell transparent container 104. The inner layer 106 accordingly facilitates packaging processes by facilitating packing or loading of the chewing gum sticks 102 as a group or collection of confectionary products into the container 104 in a single manufacturing step. By virtue of the inner layer 106, the confectionary products 102 may be loaded into the container 104 as a subassembly in a larger packing process.

In the example shown, five stacks of chewing gum sticks 102 including seven sticks in each stack are arranged side-by-side inside the inner layer 106, such that thirty-five sticks of chewing gum sticks 102 may be pre-assembled with the inner layer 106 for insertion into the receptacle 122 of the container base portion 120 as a group. In other embodiments varying numbers of chewing gum sticks 102 may be included, but the higher density of the packed gum sticks relative to conventional packages the greater the costs in packaging processes that may be realized. The increased density of chewing gum stacks in the package 100 offsets the cost of the hard shell container 104 while also reducing assembly and packaging costs via simpler loading of the chewing gum sticks 102 into the container 104.

The inner layer 106 when wrapped around the chewing gum sticks 102 is generally box-like and conforms to the orthogonal sides of the stacks of chewing gum sticks 102. The bottom end of the chewing gum sticks 102 inside the inner layer 106 is therefore rectangular, but the opening of the receptacle 122 in the container base portion 120 is curved. The curved opening of the receptacle 122 provides a clearance, however, that easily receives the bottom end of the chewing gum sticks 102 inside the inner layer 106 without alignment difficulties being presented. The box-like inner layer 106 when seen through the non-box-like container 104 also creates a unique visual impression that may aid in the branding of the chewing gum sticks 102.

The outer graphic branding layer 108 may include one or more adhesive layers applied to strategic locations on one or more of the outer surfaces of the transparent container. Like the inner graphic branding layer 106, the outer graphic branding layer may include a color, a picture, a pattern, artwork, a logo, text, patterns, symbols or indicia that when overlaid over the inner layer 106 that is visible through the transparent container 104 further provides a distinctive appearance to the package 100. Especially when the outer layer 108 is deliberately selected and configured to contrast with the inner layer 106, effective and distinct brand strategies may be employed to differentiate the confectionary products 102 in the package 100. Different outer layers 108 may be utilized with the same inner layer 106 at various different locations on the surfaces of the container 104, or unique combinations of inner and outer layers 106 and 108 and relative locations of the outer layers 108 may be adopted, again for use with a common transparent container 104 to obtain a practically unlimited number of different appearances of the package 100 at relatively low cost. When the outer layer 108 is implemented with adhesive sticker elements to the outer surface of the hard shell container 104, the outer layer 108 is durable and may maintain a fresh appearance over an extended period of time. Portions of the adhesive stickler elements may themselves be transparent to allow the inner layer 106 to be seen beneath.

The overwrap layer 110 (FIG. 4) may, like the inner and outer graphic layers 106 and 108 include a color, a picture, a pattern, a logo, text, symbols or indicia that when overlaid over the inner layer 106 and outer layer 108 on the package 100 may provide a further distinctive appearance of the package 100 than the inner layer 106 and outer layer 108 can provide alone. The overwrap layer 110 may be a transparent material including a portion 180 that is not transparent and includes a graphical color, a pattern, text, symbols or indicia as desired. In contemplated embodiments, the branded indicia or effect provided by the overwrap layer 110 is distinct from the outer graphic brand layer 108 and the inner graphic brand layer 106. The overwrap layer 110 may also include removable technical and legal information such as violator, bar code, nutrition facts and piece count for a clean branded pack in use as well as secondary branding graphics.

By virtue of the overwrap layer 110, the package 100 may be provided with a distinct shelf appearance at the point of purchase. After removal of the overwrap layer 110 the package may have another appearance for use and enjoyment of the consumer. In particular, the portion 180 of the overwrap layer 110 is no longer visible once the overwrap layer 110 is removed. As seen in the example of FIG. 4, the overwrap layer extends around the front, rear, top and bottom sides of the package but not around the lateral side walls of the container 104. This tends to make the overwrap layer 110 easier to remove and also utilizes less material than conventional packaging wherein the overwrap extends completely around the entire container 104.

Figure 3:
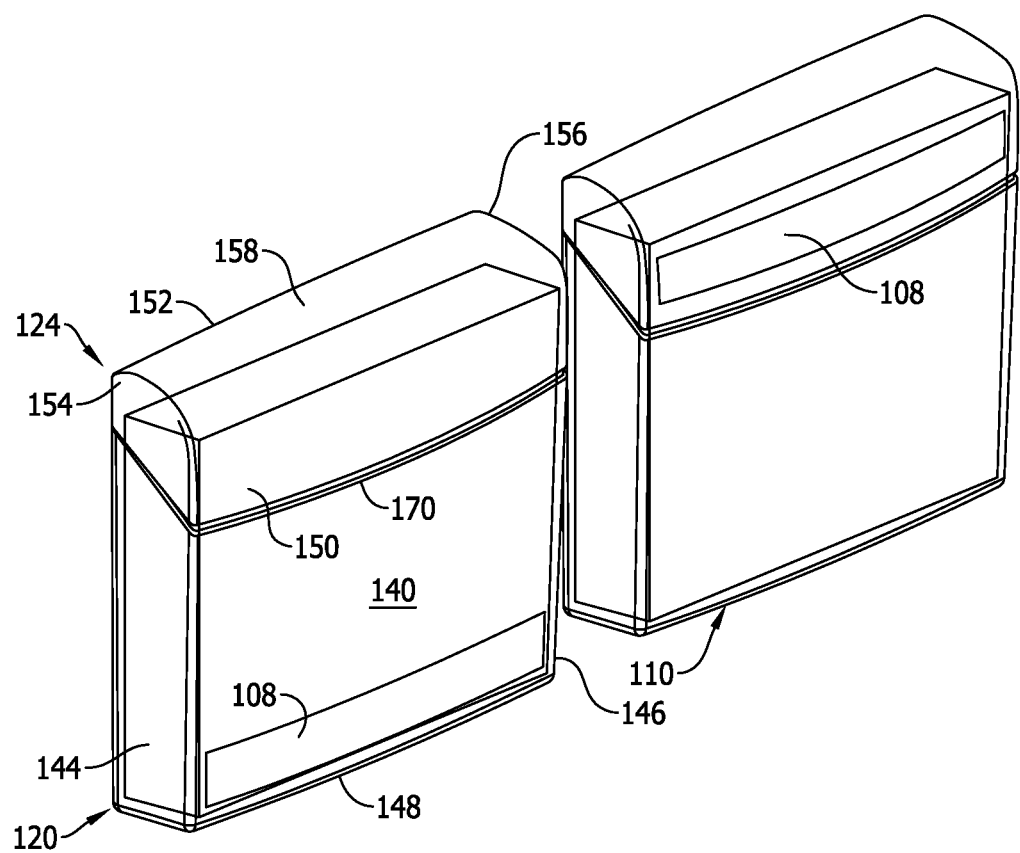
FIG. 3 is another partial exploded view of the confectionary product package shown in FIG. 1.

As shown in FIG. 1, the freshness seal element 112 overlies and surrounds an upper portion of the stacks of chewing gum sticks 102. That is, the freshness seal element 112 extends over top and side edges of the chewing gum sticks 102 in the arrangement shown. The freshness seal element 112 is coupled to the inner layer 106, but is configured for easy removability by the consumer after purchase of the package 100, while the inner layer 106 is permanently adhered in place inside the container 104. For example only, the freshness seal may include a peelable adhesive, perforations, or other known features to provide ease of removal while providing assurance of product freshness at the point of purchase. The freshness seal element 112 in contemplated embodiments is fabricated from cellophane or another suitable material, and like the layers 106, 108 and 110 freshness seal element 112 may be printed or otherwise provided with any background color, emotive element, flavor cue, text, symbols, patterns or indicia. The freshness seal element 112, like the inner layer 106, is interior to the container 104 but is visible through the transparent container 104 at the point of purchase as seen in FIGS. 3 and 4.

Finally, and as seen in FIG. 2, the organization element 114 may be provided to embrace the lower ends of the stacks of chewing gum sticks 102 and facilitate the side-by-side arrangement of the chewing gum sticks 102 prior to assembly with the inner graphic branding layer 106. The organization element 114 may be provided in the form of belly bands that hold and organize the stacks of foil wrapped chewing gum sticks 102 in the arrangement desired with a fresh appearance. The stacked chewing gum sticks 102 may first be secured with the belly bands and then inserted into the inner layer 106. Alternatively, the inner layer 106 may be formed by wrapping around the gum sticks 102 after the belly bands secure them in place. The organization element 114 may include a combination of separately provided belly bands or may be formed as one element that can accommodate a plurality of stacks of chewing gum sticks 102. The organization element 114 may facilitate the assembly of the inner layer 106 described above and insertion of the chewing gum sticks 102 into the container 104 as a subassembly per the discussion above.

While the multi-layered graphic branding element is explained in relation to an exemplary container 104, the multi-layered graphic branding approach is not limited to the exemplary container 104 as shown and described. Rather, the multi-layered graphic branding is widely applicable to the same and different containers for a variety of different products.

The benefits of the inventive concepts are now believed to have been amply illustrated in relation to the exemplary embodiments disclosed.

An exemplary embodiment of a package for a confectionary product has been disclosed including: a hard shell container that is at least partly transparent, wherein the container includes a base portion defining a first receptacle and a reclosable lid portion defining a second receptacle; a confectionary product residing partly in the first receptacle and partly in the second receptacle; and an inner graphic branding layer extended inside at least one of the first receptacle and the second receptacle, wherein the inner graphic branding layer is visible from an exterior of the container through the at least partly transparent container.

Optionally, the package may further include an outer graphic branding layer extending on the exterior surface of the hard shell container, the outer graphic branding layer being visually superimposed on the inner graphic branding element. The package may include an overwrap layer extending over the hard shell container and visually superimposed on the inner and outer graphic branding layer. The reclosable lid portion may be permanently attached to the base portion with an elongated hinge. The reclosable lid portion may be configured to engage the base portion with tactile and audible feedback to a user as the lid portion is being closed.

The package may optionally include an organization element extending interior to the inner graphic branding layer. The organization element may receive a portion of the confectionary product. The confectionary product may include chewing gum sticks. The chewing gum sticks may be wrapped in foil. A freshness seal element may be provided and may extend interior to the hard shell container. The hard shell container may be entirely transparent.

Another embodiment of a package for a confectionary product has been disclosed including: a transparent hard shell container including a base portion defining a first receptacle and a permanently attached reclosable lid portion defining a second receptacle, the lid portion being selectively positionable relative to the base portion between an opened position and a closed position; wherein the first and second receptacles are differently proportioned but collectively dimensioned to receive and enclose multiple articles of a confectionary product when the lid portion is in the closed position; an inner graphic branding element layer extending inside the first receptacle and visible from an exterior of the base portion through the at least transparent hard shell container, the inner graphic branding element holding a portion of the multiple articles of the confectionary product in a predetermined orientation; and an outer graphic branding element layer extending on the exterior surface of the transparent hard shell container and visually superimposed over the inner graphic branding element layer.

Optionally, the package may include an overwrap layer extending over transparent hard shell container and the outer graphic branding element layer, the overwrap layer visually superimposed over the inner and outer graphic branding element layers. The reclosable lid portion may be attached to the base portion with an elongated hinge. An organization element may extend interior to the inner graphic branding element layer. At least a portion of the multiple articles of a confectionary product may be received in the organization element. The multiple articles of the confectionary product may include at least one stack of foil wrapped chewing gum sticks. The package may include a freshness seal element extending interior to the second receptacle.

An exemplary method of packaging a confectionary product in a container that is at least partly transparent has also been disclosed. The hard shell container includes a base portion defining a receptacle and a reclosable lid portion. The method includes: providing an inner graphic branding element layer inside the receptacle such that it is visible through the at least partly transparent hard shell container from an exterior of the base portion; and providing an outer graphic branding element layer extending on an exterior surface of the hard shell container such that the outer graphic branding element layer is visually superimposed on the inner graphic branding element layer.

Optionally, the method further includes holding the confectionary products in a predetermined arrangement with the inner graphic branding element layer, and loading the inner graphic branding element layer including the confectionary product in the receptacle. The method may further include extending the confectionary product in an organization element, providing a freshness seal element interior to the hard shell container, and providing an overwrap layer that is visually distinct from the inner and outer graphic branding element layers and that is visually superimposed over the inner and outer graphic branding element layers. The method may also include loading a plurality of foil wrapped chewing gum sticks into the receptacle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A package for a product comprising:
  a hard shell container that is at least partly transparent, wherein the container includes a base portion defining a first receptacle and a reclosable lid portion defining a second receptacle, the container further including a pair of side walls and a length dimension defined therebetween;
  a product residing partly in the first receptacle and partly in the second receptacle, the product comprising a plurality of individually-wrapped articles each having a pair of side edges, and a width dimension defined therebetween;
  an inner graphic branding layer extended inside at least one of the first receptacle and the second receptacle; and
  an organization element inserted into the inner graphic branding layer securing an arrangement of the product in place, the organization element comprising a plurality of belly bands defining a plurality of compartments arranged along the length dimension of the container, wherein each compartment is sized to have a length dimension that corresponds to the width dimension of the individually-wrapped articles, wherein a stack of individually-wrapped articles is positionable within each compartment such that respective articles in adjacent stacks are in a side-by-side arrangement along the length dimension of the container;
  wherein the inner graphic branding layer is visible from an exterior of the container through the at least partly transparent container; and
  wherein the organization element is formed as one element comprising the plurality of belly bands.

2. The package of claim 1, further comprising an outer graphic branding layer extending on the exterior surface of the hard shell container, the outer graphic branding layer visually superimposed on the inner graphic branding element.

3. The package of claim 2, further comprising an overwrap layer extending over the hard shell container and visually superimposed on the inner and outer graphic branding layer.

4. The package of claim 1, wherein the reclosable lid portion is permanently attached to the base portion with an elongated hinge.

5. The package of claim 1, wherein the reclosable lid portion is configured to engage the base portion with tactile and audible feedback to a user as the lid portion is being closed.

6. The package of claim 1, wherein the organization element receives a portion of the product.

7. The package of claim 1, wherein the product comprises chewing gum sticks.

8. The package of claim 7, wherein the chewing gum sticks are wrapped in foil.

9. The package of claim 1, further comprising a freshness seal element extending interior to the hard shell container.

10. The package of claim 1, wherein the hard shell container is entirely transparent.

11. The package of claim 1, wherein at least a portion of the multiple articles of the product are received in the organization element.

12. The package of claim 11, wherein the multiple articles of a product comprises at least one stack of foil wrapped chewing gum sticks.

13. A package for a product comprising:
  a transparent hard shell container including a base portion defining a first receptacle and a permanently attached reclosable lid portion defining a second receptacle, the lid portion being selectively positionable relative to the base portion between an opened positon and a closed position, the transparent hard shell container further including a pair of side walls and a length dimension defined therebetween;
  wherein the first and second receptacles are differently proportioned but collectively dimensioned to receive and enclose multiple articles of a product when the lid portion is in the closed position;
  an inner graphic branding element layer extending inside the first receptacle and visible from an exterior of the base portion through the transparent hard shell container, the inner graphic branding element holding a portion of the multiple articles of a product in a predetermined orientation;
  an organization element inserted into the inner graphic branding layer securing an arrangement of the product in place, the organization element comprising a plurality of belly bands defining a plurality of compartments arranged along the length dimension of the transparent hard shell container, wherein the organization element is formed as one element comprising the plurality of belly bands; and an outer graphic branding element layer extending on the exterior surface of the transparent hard shell container and visually superimposed over the inner graphic branding element layer.

14. The package of claim 13, further comprising an overwrap layer extending over transparent hard shell container and the outer graphic branding element layer, the overwrap layer visually superimposed over the inner and outer graphic branding element layers.

15. The package of claim 13, wherein the reclosable lid portion is attached to the base portion with an elongated hinge.

16. The package of claim 13, further comprising a freshness seal element extending interior to the second receptacle.

* * * * *